Sept. 27, 1966  J. O. BENSON  3,274,920
CONTINUOUS DEEP FAT FRYER
Original Filed Feb. 14, 1963  5 Sheets-Sheet 1

INVENTOR.
JOHN O. BENSON
BY Harold D. Jastram
ATTORNEY

Sept. 27, 1966  J. O. BENSON  3,274,920
CONTINUOUS DEEP FAT FRYER
Original Filed Feb. 14, 1963  5 Sheets-Sheet 2

INVENTOR.
JOHN O. BENSON
BY Harold D. Jastram
ATTORNEY

Sept. 27, 1966 J. O. BENSON 3,274,920
CONTINUOUS DEEP FAT FRYER
Original Filed Feb. 14, 1963 5 Sheets-Sheet 3

INVENTOR.
JOHN O. BENSON
BY Harold D. Jastram
ATTORNEY

INVENTOR.
JOHN O. BENSON
BY Harold D. Jastram
ATTORNEY

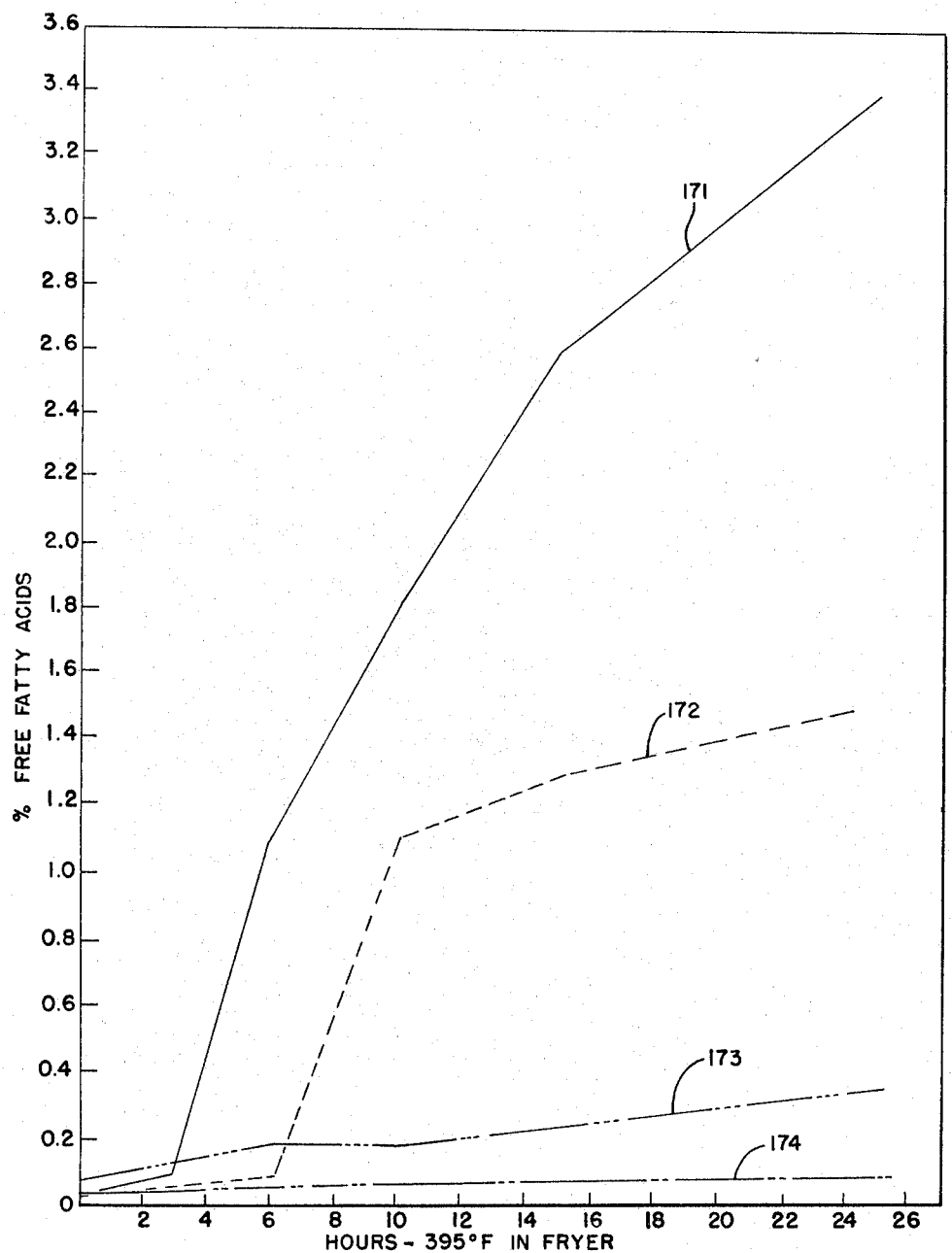
FIG. II

United States Patent Office 3,274,920
Patented Sept. 27, 1966

3,274,920
CONTINUOUS DEEP FAT FRYER
John O. Benson, Mayer, Minn., assignor to General Mills, Inc., a corporation of Delaware
Original application Feb. 14, 1963, Ser. No. 258,577. Divided and this application Feb. 12, 1965, Ser. No. 432,089
3 Claims. (Cl. 99—404)

This application is a division of application Serial No. 258,577, filed February 14, 1963.

This invention relates to an apparatus for deep fat frying food products, and more particularly to an apparatus for continuously deep fat frying cereal products in cooking oil with a minimum accumulation of undesirable contaminants.

Satisfactory, deep fat frying of various food products such as cereal products requires close heat control. Close control of the temperature of the cooking oil must be maintained in order to properly cook the product without undue absorption of oil by the product and to cook the product without burning or otherwise damaging the product being processed. The proper control of the temperature of the cooking oil is in some measure dependent upon the circulation of the oil about the product and about the heating coils utilized to heat the oil. Many fryers which are more or less satisfactory utilize only convection currents set up by the heated oil for circulation purposes. However these convection currents often produce insufficient circulation of the cooking fat or oil about the heating coils and consequently result in damage to the oil itself. Poor circulation of the oil and local overheating of the oil near the hot wall or heating element of a heater results in the accumulations of high concentrations of constituents such as free fatty acids. Normally it is desirable to maintain the free fatty acid concentration or the concentration of other elements at a predetermined level in the cooking oil in order to produce a finished product which can be stored for an extended period of time without a change of the flavor.

Poor quality control for the cooked product results if the temperature of the oil and the constituents of the oil cannot be controlled to a rather precise degree. Imprecise control of the time the product is cooked, often results in an additional contribution to the breakdown of the oil which in turn results in an unusually frequent need to replace the entire bulk of the oil in the system.

Imprecise control of the temperature of the oil, the circulation about a heater and the cooking time for the product when it is in contact with the oil results in an acceleration of the breakdown of the oil. In the usual system this rapid breakdown of the oil results in an interruption of the frying process since the entire volume of the frying oil must be drained from the system and replaced with fresh oil before the frying operation can continue.

It is therefore an object of the present invention to provide a new and improved apparatus for continuously deep fat frying food products.

It is another object of the present invention to provide a new and improved apparatus for continuously deep fat frying food products under controlled conditions to prevent the accumulation of undersirable constituents in the cooking oil.

It is yet another object of the present invention to provide a new and improved apparatus for continuously deep fat frying a food product in the cooking oil which is continuously circulated, heated, and replenished to maintain the free fatty acid concentration of the oil at a low and constant level for an extended period of time.

It is another object of the present invention to provide a new and improved apparatus which is capable of continuous operation in which there is employed a small quantity of cooking oil or fat relative to the volume of food immersed therein at any one time and which oil is replaced on a periodic basis to maintain the undersirable constituents of the oil at a minimum level.

A complete understanding of the invention may be obtained from the following detailed description of an apparatus forming specific embodiments, when read in conjunction with the drawings, in which.

Figure 4:
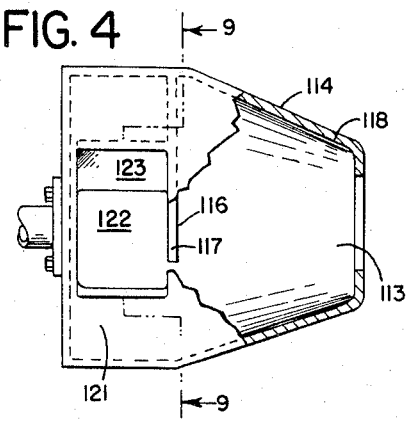
Figure 5:
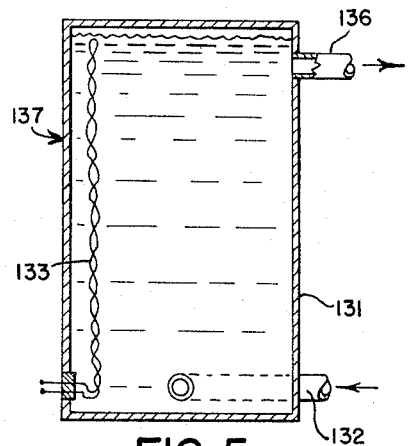
Figure 3:
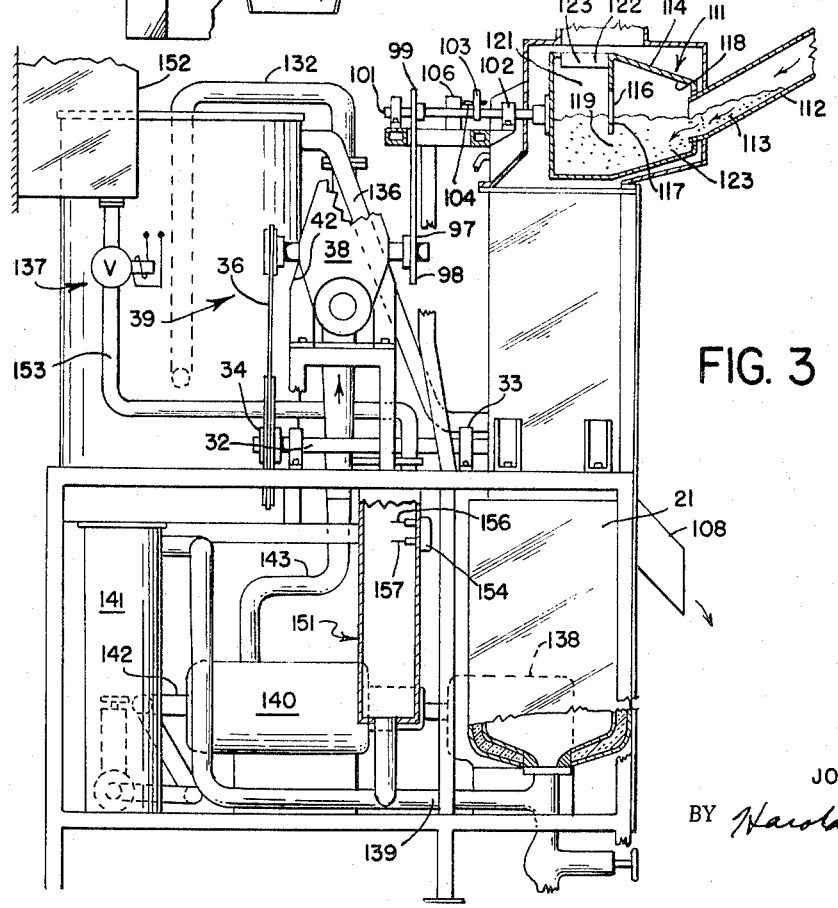
FIGURE 3 is a left end view of the apparatus shown in FIGURE 1.
Figure 9:
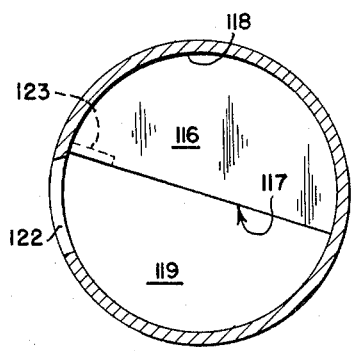
Figure 7:
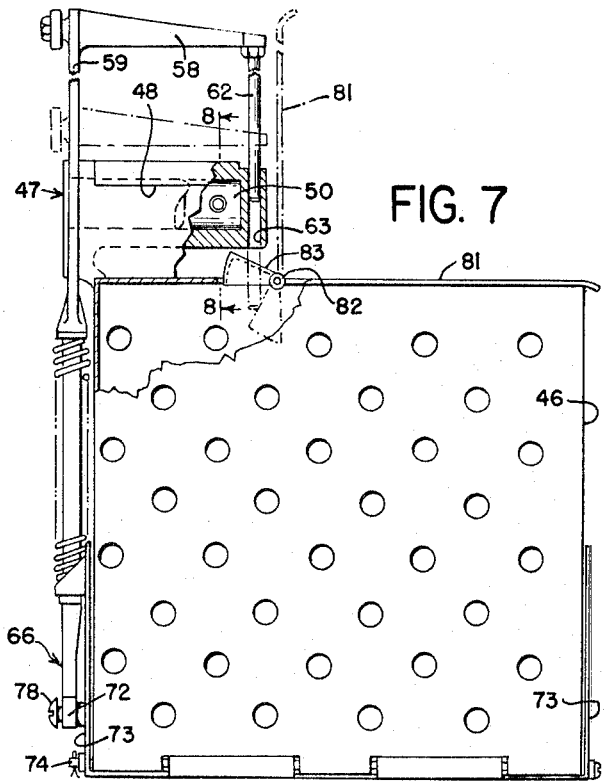
Figure 6:
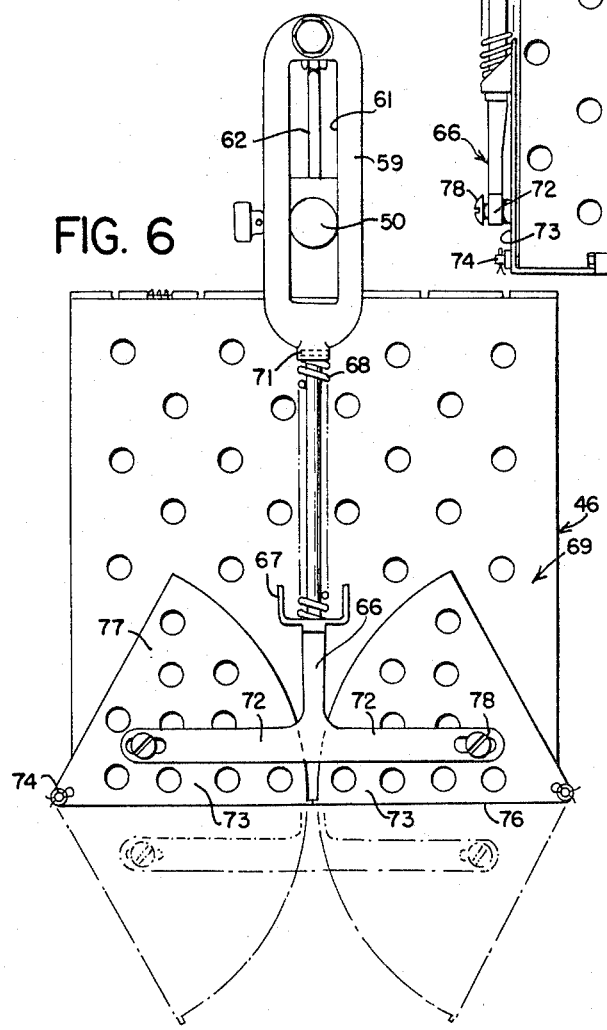
Figure 8:
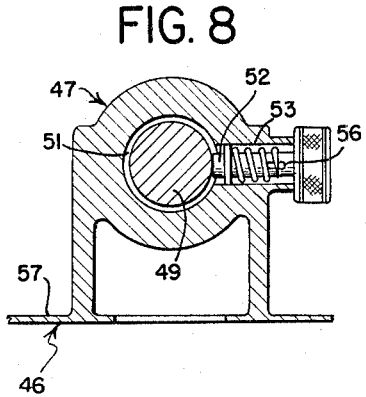
Figure 10:
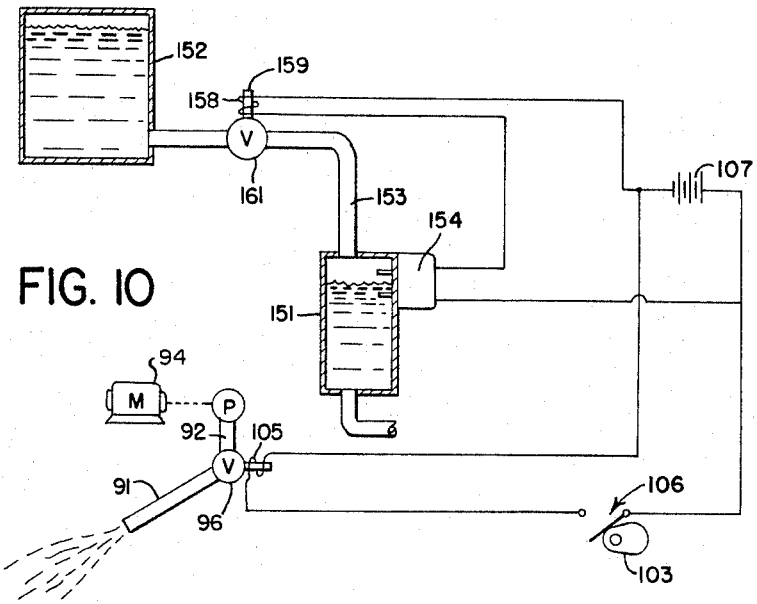
Figure 12:
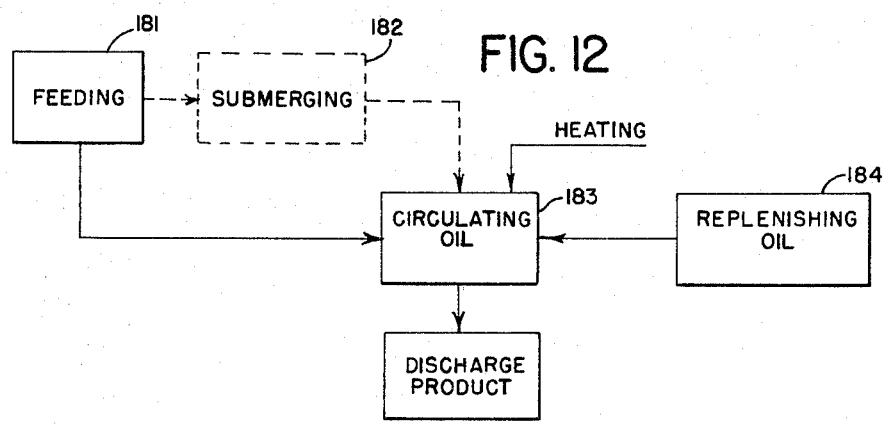

FIGURE 4 is an enlarged view of a material meter, partly in cross section, which is disclosed in FIGURE 3, FIGURE 5 is a cross section of a heater utilized for heating oil to a cooking temperature, FIGURE 6 is a back view of a bucket utilized to contain the food product, FIGURE 7 is a right side view of the bucket shown in FIGURE 6, FIGURE 8 is a cross sectional view taken along line 8—8 of FIGURE 7, FIGURE 9 is a cross sectional view taken along line 9—9 of FIGURE 4, FIGURE 10 is a circuit diagram showing the circuitry utilized to control some of the valves which coordinate the operations of the apparatus, FIGURE 11 is a graph showing percent free fatty acid product against hours of cooking time for a batch type fryer and a continuous fryer, and FIGURE 12 is a flow diagram showing the continuous cooking of a food product.

Figure 1:
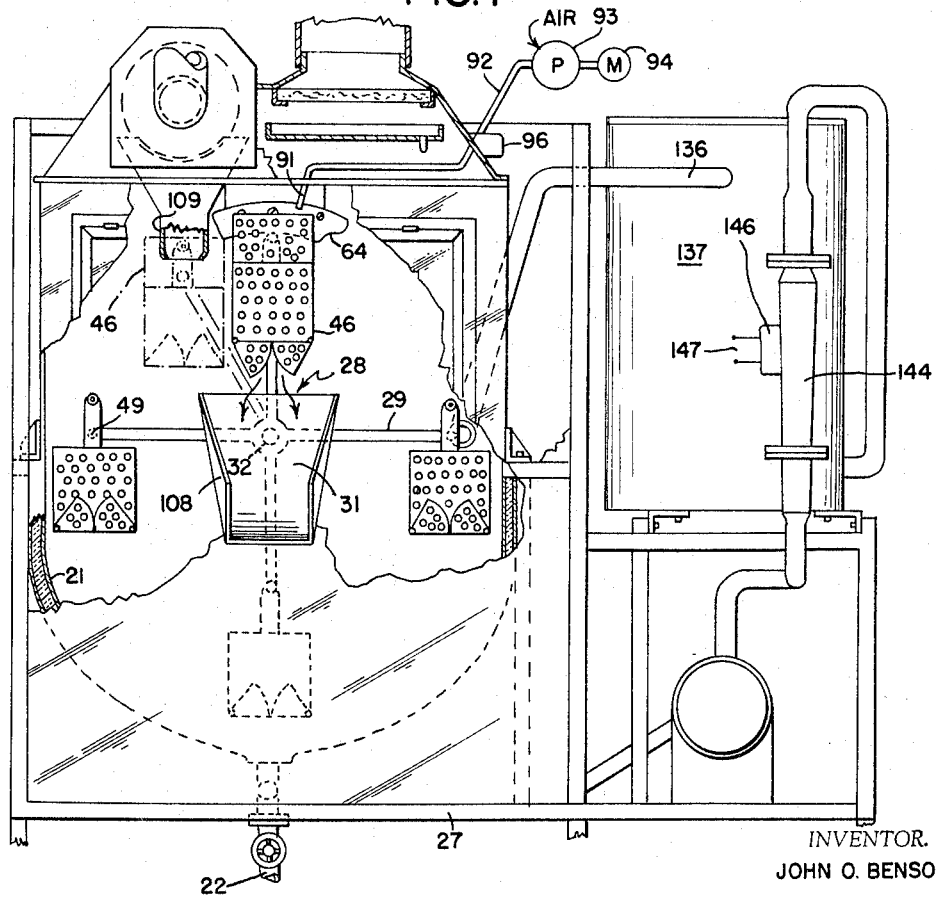
FIGURE 1 is a front view of an apparatus according to the invention.
Figure 2:
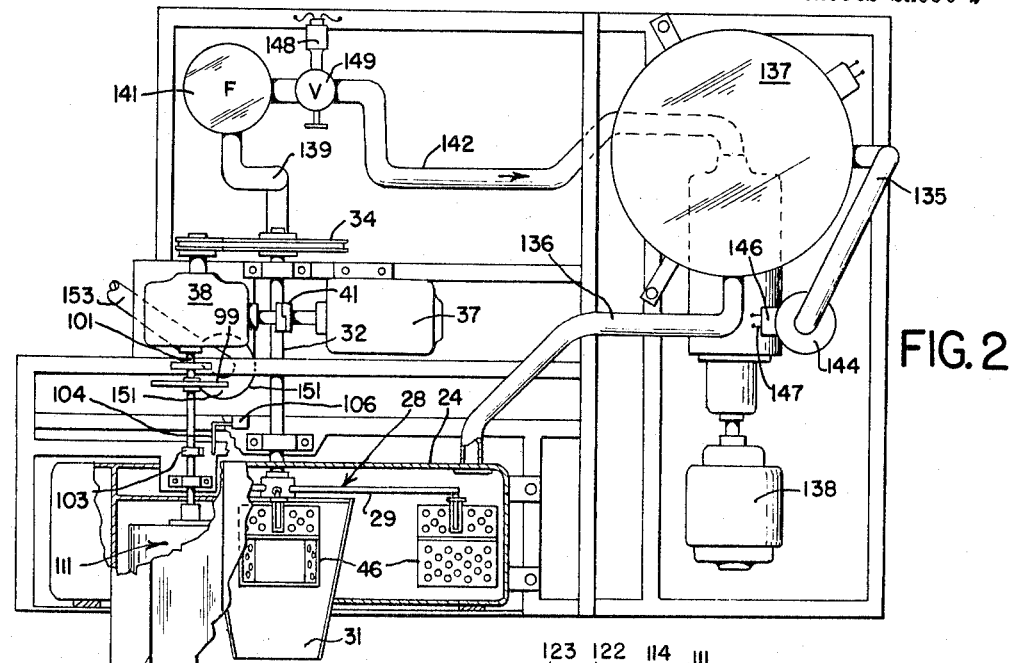
FIGURE 2 is a top view of the apparatus shown in FIGURE 1.

Refer first to FIGURE 1 of the drawings, FIGURE 1 is a front view of the machine according to the present invention showing the tank 21 which is utilized to contain frying oil such as safflower oil, corn oil, coconut oil, and the like. In order to provide a container which is adequately large to accommodate a Ferris wheel type product supply system, the container 21 is shaped basically in the form of a semicircle. At the bottom of the tank or container 21 is an outlet or drain 22 for discharging any accumulations of product or the like which might settle to the bottom of the tank. The drain 22 is also utilized to drain the entire tank when the apparatus is not in use. A top view of the tank 21 is shown in FIGURE 2 of the drawings. It is noted there that the tank or container 21 is generally rectangular in shape. The container 21 is relatively narrow from front to back in order to provide a minimum of tank volume. It is only large enough to accommodate the Ferris wheel type material supply system. This optimum tank size is utilized in order to provide adequate oil for completely submerging the product and at the same time maintain a minimum of hot oil exposed to the atmosphere. Exposure to the atmosphere reduces the quality of the oil by oxidation and results in a need to replace the cooking oil on a less frequent basis. Consequently, the tank or container 21 is shaped as described to maintain the oil in the fryer in as good condition as possible for an extended period of time.

The tank is mounted on a chassis 27 which provides the supporting structure for all of the elements of the apparatus. The container 21 is bolted to the chassis 27 or connected to the chassis 27 in some other suitable manner such as welding.

A Ferris wheel type product supply generally designated by the numeral 28 is mounted at the rear or near the rear wall 24 of the container 21. The Ferris wheel type product supply 28 has a number of arms 29. These radially extending arms 29 are mounted on a hub 31 which is connected to a drive shaft 32. The drive shaft 32 is connected to the chassis 27 by a bearing block 33. Opposite the hub 31, is a sprocket 34 which is engaged by a sprocket chain 36. Sprocket chain 36 and sprocket 34 are driven by a variable speed drive motor 37 which is connected to the drive sprocket 34 by a gear reducer system 38 and a sprocket and chain system generally designated by the numeral 39.

The motor 37 is connected by a clutch 41 to the gear reducer 38. The gear reducer 38 is utilized to set the operational speed of rotation of sprocket 42 and the connected sprocket 34. This in turn regulates the speed of rotation of the Ferris wheel 28. This rotation is regulated to time the movement of the Ferris wheel 28 with other parts and operations of the continuous fryer.

Thus it can be seen that the gear reducer system 38 permits a precise control of the rate of rotation of the Ferris wheel 28 which carries baskets or buckets 46. Additionally with this precise control of the rate of rotation of the Ferris wheel 28 and the use of optimum container size 21 which contains oil or cooking fat, it is possible to closely regulate the relationship between the volume of product which is introduced into the container 21 for a given period of time in relation to the amount of oil which is contained in the entire system including the container 21. This precise regulation of the amount of product introduced into the oil and a use of minimum oil in the system results in a control of contaminants which are introduced into the oil. This control permits maintenance of a high quality of cooking oil for a continuous frying operation.

At the end of each of the radially extending arms 29 of the Ferris wheel 28, a bucket 46 is pivotally attached. These buckets carry the food products, such as a cereal product, into and out of the oil in the deep fat fryer. The buckets 46 are perforated buckets designed to carry the product into and submerge the product in the frying oil.

Refer to FIGURES 6 and 7 for enlarged detailed views of the buckets 46. Lugs 47 are utilized to pivotally connect the basket or bucket 46 to the arms 29 of the Ferris wheel. The lug 47 contains an aperture 48 which is designed to receive a projection or shaft 49 of the arm 29. This projection or pivotal shaft 49 is inserted within the aperture 48. Each projection 49 contains a slot 51 near one end of the projection 49. This slot 51 engages a pin 52 which is inserted within the opening 48 through an aperture 53 in lug 47. The pin 52 is spring biased by a spring 54 so that the pin 52 engages the slot 51 to lock the projection 49 into the lug 47. One end of the spring 54 rests against a retainer pin 56 and the other end rests on a shoulder in aperture 53. Thus when the projection 49 is inserted within the aperture 48 the arm 29 of the Ferris wheel is permanently and pivotally attached to the bucket 46. The lug 47 is in turn connected to the sidewall 57 of the bucket 46.

Refer now to FIGURE 7 of the drawings. A cam follower 58 is bolted or otherwise connected by suitable means to a slide 59. A portion 50 of the mounting lug 47 projects into a slot 61 of the slide 59 (refer to FIGURE 6). The projecting portion 50 of the lug 47 vertically guides the slide 59 when it is moved from an upper position shown by the solid lines in FIGURE 7 to a lower position illustrated by the dotted lines in FIGURE 7.

Opposite the slide 59, a rod 62 is attached to the cam follower 58. This rod 62 engages an aperture 63 in the lug 47. Rod 62 is a guide which provides a means for guiding the cam follower 58 when the follower is moved vertically by a caming surface 64 which is shown in FIGURE 1 of the drawings. Follower 58 is a tapered roller which is mounted for rotation about a horizontal axis as viewed in FIGURE 7.

Opposite the cam follwer 58, a T-bar 66 is connected to the slide 59 so that the leg of the T-bar 66 engages the slide 59. A bracket is fitted to the leg of the T-bar 66 and captures a compressible coil spring 68 between the bracket 67 and the slide 59. The bracket 67 is connected permanently to the back surface 69 of the basket 46 so that the coil spring 68 is compressed when a cam such as cam 64 shown in FIGURE 1, forces the cam follower 58 and slide 59 vertically downward as viewed in FIGURE 6. The spring 68 is captured between the bracket 67 and a flared portion 71 of the slide 59 at a point where the leg of the T-bar is attached to the slide 59.

The arms 72 of the T-bar 66 are attached to gates 73 of the container 46. Gates 73 are pivotally connected by a hinge type joint 74 to the body of the container 46. The hinge 74 extends across the entire side of the container 46 as shown in FIGURE 7 of the drawings.

The gates 73 are each designed to cover half of the bottom 76 of the container 46 in order to trap food products such as flakes or grains of cereals in the container 46 during the frying operation. The gates 73 may or may not be perforated depending upon the characteristics of the product and the amount of oil circulation which is needed about the product while the cooking or frying is taking place.

The gates 73 are opened for discharge of the product as shown by the dotted lines in FIGURE 6 of the drawings. The arms 72 of the T-bar 66 are attached to the extended sides 77 of the gates 73. A bolt or rivet 78 engages a slot 79 in each of the arms 72 so that the gates 73 may be easily opened by vertical downward movement of the T-bar 66. When the cam follower 58 engages the cam 64, the follower 58, slot 59, and rod 62 are forced vertically downward as viewed in FIGURE 6. The spring captured between the flared portion 71 and the bracket 67 is compressed and the T-bar 66 is displaced to the dotted position shown in FIGURE 6. When the T-bar 66 is thus displaced, the arms 72 of the T-bar force the gates 73 open as shown in the dotted lines in FIGURE 6. Any product which might be contained in the container 46 is then discharged as a result of the opening of gates 73. When the cam 64 disengages the cam follower 58, the compressed coil spring 68 forces the cam follower, the slide 59 and the T-bar 66 vertically upward and thus closes the gates 73 so that the container 46 can again be charged with product for another cooking cycle.

The bucket 46 is provided with a hinged lid 81. This lid is used to prevent the food product from floating out of the bucket 46 when the bucket is completely submerged in the hot cooking oil. The lid 81 may be perforated to permit free circulation of the oil through the bucket to help insure uniform frying of the food product.

The lid 81 is connected to the bucket 46 by a hinge 82. An extension 83 of the lid 81 extends beyond the hinge 82 and is utilized to open lid 81 in cooperation with the rod 62. When the cam follower 58 is displaced by cam 64, the rod 62 engages the extension 83. The extension 83 is displaced by rod 62 to the dotted position illustrated in FIGURE 7, thus pivoting the lid 81 open. The lid remains open until after the bucket 46 is recharged with food product.

When the gates 73 of the buckets 46 are opened, the cooked product is discharged. However, very often some cooked products will tend to cling to the sides of the bucket 46 or to the inside surface of the gate 73. If this cooked food product should remain in the buckets 46 after the gates are closed and the bucket is recharged, the already cooked product would again be fried. This second frying of the food product will burn the product. Discharge of this burnt or overcooked product tends to reduce the overall uniformity and quality of the product and is undesirable. Consequently, an air discharge assist is utilized to insure complete discharge of all food products from the bucket 46. A nozzle 91 is mounted on the frame or chassis 27 of the machine (see FIGURE 1). The nozzle 91 is located so that the gates 73 and the lid 81 are open before the nozzle discharges air. This location is illustrated in FIGURE 1 of the drawings where the bucket 46 is shown in the uppermost position with the gates 73 opened and the lid 81 opened by the cooperation of the cam 64 and the cam follower 58.

A nozzle 91 is connected through a conduit 92 to an air pump 93 which supplies air to the nozzle 91 at a discharge pressure adequate to dislodge any food product which may cling to the sides or bottom of the bucket 46. A motor 94 is utilized to drive the air pump. The air discharged from the nozzle 91 must be controlled so that the air is discharged from the nozzle 91 only when a bucket 46 is in position as shown in FIGURE 1 with the gates 73 and lid 81 opened. A valve 96 is placed in the line 92 to control the air flow in the line 92. Valve 96 is a solenoid valve or any other type of valve which may be controlled to periodically open and close the line 92.

A gear-type timing device is utilized to accomplish the periodic opening and closing of the valve 96. Refer now to FIGURE 3 of the drawings. A timing system generally designated by the numeral 97 is connected to the gear reducer 38. The timing system 97 is a chain and sprocket arrangement having a drive sprocket 98 connected to a timing sprocket 99. The sprocket 99 is connected to a shaft 101 which is mounted on the chassis by bearing blocks 102. The shaft 101 carries a cam 103 which rotates with the shaft 101 and engages an extended arm 104 of a micro switch 106. As previously noted, the Ferris wheel 28 is timed through the gear reducer 38. This same gear reducer 38 is also utilized to time the rotational shaft 101 so that the cam 103 engages the microswitch 106 each time a bucket 46 is in the uppermost position or discharge position as shown in FIGURE 1 of the drawings.

When the arm 104 of microswitch 106 is actuated, the microswitch 106 closes an electrical circuit to energize a solenoid 108 associated with the solenoid operated valve 96. Refer to FIGURE 10 of the drawings. The microswitch 106 is shown with the cam 103. When the switch 106 is closed, the power source 107 is placed across the solenoid 108. Solenoid 108 opens the solenoid operated valve 96 and permits air to pass from the line 92 to the nozzle 91. Thus the discharge of air from nozzle 91 is precisely timed with the arrival of the bucket 46 at the discharge position. The blast of air which occurs from the nozzle 91 purges the bucket 46 of all of the fired product so that it is discharged into a discharge chute 108. The microswitch 106 is only momentarily operated by the cam 103 and as soon as the shaft 101 is rotated through a predetermined arc, the microswitch 106 is again returned to its opened position as shown in FIGURE 10. The solenoid valve 96 is then again closed and the air flow from the nozzle 91 is terminated.

After the bucket 46 has been purged of cooked food product, the Ferris wheel 28 is rotated in the counterclockwise direction as viewed in FIGURE 1 to a position which is shown in dotted lines. In this position, the bucket 46 is situated under a charging chute 109. As the bucket 46 is rotated in the counterclockwise direction by the Ferris wheel 28, the cam follower 58 disengages the cam 64 and the spring 68 mounted on the T-bar 66 returns the cam follower 58, T-bar 66 and gates 73 to the closed position so that food products may be trapped in the bucket 46.

The bucket 46 is charged with a measured quantity of food product. The bucket must be charged with a known quantity of the product so that precise control of the amount of product immersed in the oil over a given period of time may be accurately controlled. This precise control of the amount of product which is immersed and fried in the oil acids control of the quality of the oil as measured by the concentration of free fatty acids which accumulate in the oil when it deteriorates.

In order to accomplish the precise control of products placed in the bucket 46, a metering chamber 111 is utilized to charge the buckets 46. Refer now to FIGURES 3, 4, and 9. The product is introduced into the metering chamber 111 through a chute 112. The product from chute 112 is trapped in a chamber 113 which is formed by the beveled side walls 114 of the metering chamber 111 and an interior retaining wall 116. The retaining wall 116 extends across the metering chamber 111 from side to side but contains an opening 119 between the top surface 117 of the wall (see FIG. 9) and the inside surface 118 of the metering chamber 111. This opening 119 permits the food product to flow into a second chamber 121 of the metering chamber 111. The chamber 121 contains an opening 122 for discharging the product from the metering chamber 111 when the metering chamber has been rotated by the indexing system 97.

The metering chamber 111 is mounted on shaft 101 of the indexing system 97. The clockwise rotation of the metering chamber 111 is timed so that each time a bucket 46 is rotated to the position shown by the doted lines in FIGURE 1, the metering chamber 111 is rotated so that the discharge opening 122 is at the bottom of the chamber as viewed in FIGURE 3. Consequently, the food product which is contained in the chamber 113 is discharged through the opening 119 to the chamber 121 where it is further discharged into the bucket 46 through opening 122. The discharged product flows from the chamber 121 into the chute 109 and into the bucket 46.

The bucket lid 81 which was previously opened by the rod 62 is now maintained in an opened position by engagement with the chute 109. Chute 109 prevents closure of the lid 81 until after the product has entered the bucket 46 and the bucket has moved out of engagement with the chute 109. After the bucket 46 is further rotated in the counterclockwise direction out of engagement with the chute 109, the lid 81 which is no longer engaged by the rod 62, will close and cover the food product in the bucket 46. Closure of the lid 81 prepares the bucket for submersion in the oil. The lid 81 prevents the product which is to be fried in the oil from floating out of the bucket 46 as the food product and bucket are completely immersed in the oil for the frying operation.

After the bucket 46 has been charged, the shaft 101 continues to rotate the chamber 111 so that the opening 122 is no longer in a position to discharge products. New products continue to enter the chamber 113 in preparation for a new charging cycle which will take place with the next succeeding bucket brought into alignment with the chute 109. The product is continuously fed to the metering chamber 111 but the wall 116 and the configuration of the chamber 111 permits measured quantities of the material to be deposited in the bucket 46. The wall 116 interrupts the flow of the material when no bucket 46 is aligned with opening 122. A projection 123 extended along one side of opening 122 to help control the discharge of the material through opening 122.

The gear reducer 38 is selected so that it will drive the Ferris wheel 28 at desired speed. Either the gear reducer itself may be selected to increase or reduce the speed of rotation of the Ferris wheel 28 or the sprocket and chain arrangement which drives the shaft 32 may be selected to adjust the rotational speed of the Ferris wheel 28. As an example, the rotational speed of the Ferris wheel can be adjusted so that the product is submerged in the oil for as little as 5 seconds to as long as 50 seconds. This period of time, depending upon the temperature of the oil and other factors, is normally adequate to fry the food product which is contained in the bucket 46. The movement of the Ferris wheel 28 carries the bucket 46 from the initial immersion of the bucket and product in the oil, into the tank or container 21, till it finally emerges from the oil a predetermined time after entrance of the bucket into the oil. The product, after removal from the oil, is uniformly cooked to a satisfactory degree and is then discharged from the bucket 46 at a discharge station where the product engages chute 108. Thus a complete cycle of the cooking operation has been completed by the continuous deep fat fryer.

Oil is supplied to the tank or container 21 by an oil supply and circulating system in order to further achieve continuous operation of the frying apparatus for extended periods of time without undue or excessive deterioration of the cooking oil. As has been previously noted, the container 21 is so shaped that the Ferris wheel 28 with the attached buckets 46 fit with a minimum of wasted volume within the container 21. This use of a minimum volume for the container 21 results in a need for a minimum volume of oil in the container 21 for the frying operation. The reason for maintaining this container 21 at a minimum volume and in a shape adequate only to admit the Ferris wheel type supply system is to reduce the surface area of the oil which is exposed to the atmosphere. Exposure of hot cooking oils to an oxygen laden atmosphere results in oxidation of the hot oil. Oxidation of the oil results in a breakdown of the oil and reduction of the quality of the oil. Additionally, the reduced volume of the container 21 reduces the amount of oil which must be heated to elevated frying temperatures in order to achieve satisfactory frying of the product. Exposure of the oil to the atmosphere at these elevated frying temperatures tends to contribute to the breakdown of the cooking oil. Thus a reduction of the quantity of oil which is heated to the frying temperatures reduces the quantity of oil which is subject of deterioration or breakdown in quality.

Due to the inherent nature of deep fat frying operations, however, a complete elimination of the oxidation of oil or deterioration of oil due to elevated frying temperatures cannot be completely eliminated. However, its effect may be reduced to a minimum. An oil supply system is provided for the apparatus which is capable of maintaining precise control of the circulation of the oil in the entire system. Provision is also made to maintain the oil level in the container 21 at a precise level. The control of the circulation and level helps reduce to a minimum the exposure of the oil to the atmosphere and reduces exposure of a given volume of oil, for extended periods of time, to excessive hot wall temperatures in the remote heater utilized in the system. Additionally, the remote heater directly heats the oil in order to reduce the hot wall temperatures and in order to help maintain a low concentration of contamination in the oil.

Refer now to FIGURE 5 of the drawings which shows a heater for directly heating the cooking oil. Oil enters the heater 137 through line 132. The oil is heated in the heater 137 by an electrical coil 133 which is in direct contact with the frying oil. This direct contact of the heater coils 133 with the frying oil permits a minimum temperature of the heating coils 133 in order to heat the oil to a satisfactory temperature. This maintenance of the heating coils 133 of the heater at a minimum temperature necessary to attain the frying temperature results in an extension of the period of time the oil may be used before accumulations of contaminant requires its removal. Heat is transferred more readily from the coils 133 to the oil in this system than in a heating system where several heat transfers must take place before the oil is heated. In this case the heating coils 133 are low amperage heating coils.

The heated oil then rises to the top of the tank 131 and exits through line 136 where it flows to the container 21. Experience with this type of heater has shown that the hot wall temperature may be maintained as low as from about 390° F. to 500° F. and yet the fying oil will be heated to a frying temperature of from about 330° F. to about 420° F.

After the oil has been properly heated in the heater 137, it is discharged through a line 136 which interconnects the heater 137 and the container 21. The heated oil flows into the container 21 due to the pumping action of a pump 140 which is driven by a motor 138. The motor 138 and pump 140 may be a system which provides a constant volume of flow of the oil throughout the system. This constant flow pump permits the use of valves for regulating the rate of flow of oil in the system. In other words, if an increase in the oil flow is desired, then a valve may merely be opened or closed in order to increase or decrease the flow of the oil in the system.

The hot frying oil is discharged into the container 21 where the Ferris wheel 28 carries the product laden buckets 46 into the heated oil. The product is cooked to a desired degree by the hot oil and is then removed from the oil by the Ferris wheel system. The oil is then pumped out of the container 21 through line 139 and is returned to the heating components of the system.

Refer now to FIGURES 3 of the drawings. The cooled oil travels from the container 21 through a line 139 and is directed into a filter 141. As might be expected small particles of the food product escape from the buckets 46 through the perforations in the walls and bottom of the bucket.

These small particles tend to flow with the oil throughout the system. Consequently, some means is needed to remove these particles from the circulating oil in order to prevent plugging of the various lines and components of the heating and circulating system. The filter 141 filters these suspended particles and cleans the oil before it is returned to the pump 140 through line 142.

The pump 140 then forces the oil through line 143 into a rate of flow meter 144. The rate of flow meter is used in system to maintain a constant check on the rate of flow of the oil throughout the system. A rather constant, uniform, and high rate of flow is utilized in the system in order to return the oil to the heater 137 often enough to prevent high losses of heat energy in the oil. This conservation of the heat in the circulating oil reduces the need for high heater element temperatures in order to restore the cooled oil to a frying temperature. This reduction in the heater element temperatures necessary to return the oils to the frying temperature, reduces deterioration of the oil due to high temperatures. The rapid circulation of the oil also has a tendency to maintain the oil in a particle free or cleaned condition so that the oil remains of high quality for extended periods of time. Maintenance of the oil quality for extended periods of time is a desirable feature in a continuous fryer such as this one.

Any number of commercial devices may be used as a rate of flow indicator. One such device is an Armet Rotometer No. 36–11. The meter 144 contains an electrical system 146. When an undesirable flow rate occurs in the system, a signal is generated and is amplified. The electrical system 146 contains a contact means which is responsive to the amplified signal. This switch is connected to the conventional servo system by contacts 147. The servo system is not shown, however, it is a conventional system which interconnects the contacts 147 and a servo motor 148. The servo system may be designed so that the motor 148 opens and closes a valve 149 in accordance with a signal which is received from the flow meter 144. The signal indicates the rate of flow whether greater than an optimum value or less than an optimum value. Depending upon the variation of the oil flow from the optimum value, the motor 148 operates the valve 149 to increase or decrease the flow of oil through the system.

The rate of flow in the system may be adjusted depending upon the particular operating characteristics of the fryer. For instance, if a relatively quantity of suspended particles is captured in the oil circulating in the system a higher rate of flow may be necessary to maintain the oil in a relatively clean condition. Also, the rate of flow may be adjusted in accordance with the characteristic heat losses of the system in order to maintain a certain temperature of the cooled oil when it returns to the heater 137. This rate of flow, however, will have to be adjusted in accordance with the heat loss characteristics of the circulatory system and will naturally vary from machine to machine depending upon the type of conduit or lines used, the type of filter used, the volume of the system, the distance between the heater 137 and the container 21, and other similar physical considerations.

After the oil passes through the flow meter 144 it is returned via line 132 to the heater 137. The oil is then again heated by the heating elements 133 and it is again discharged through the line 136 where it is used to fry food products.

In a continuous deep fat fryer such as this one, where a minimum volume of oil is utilized to fry the food product, a precise control of the level of oil in the container 21 is desirable. A control is necessary for several reasons. First of all, deep fat fried products normally absorb a great deal of fat. The finished or cooked product may, for instance have a concentration of from 30 to 60% fat. Most of this fat is picked up in the deep fat fryer during the frying operation. If a relatively large volume of product is being fried in a fryer having a minimum volume of oil, the removal of the frying oil becomes quite appreciable. The removal of the frying oil at a relatively rapid rate, however is utilized in this continuous deep fat fryer in order to maintain a high quality of oil for an extended period of cooking time.

In order to regulate the level of oil in the container 21, a surge tank 151 is connected into the line 139. New oil from tank 152 is introduced into the surge tank 151 through a line 153 in accordance with the removal of the oil from the container 21 by the product. The surge tank 151 is situated behind the container 21 and is tied into the container 21 so that the level of the oil in the surge tank 151 is the same as the level of the oil in the container 21 during the cooking operation. A fluid level control 154 is mounted in the wall of the surge tank 151. The level control may be a commercial item such as that manufactured by H. Fielden & Company, No. ME 10–4. The control level has a pair of contacts 156 and 157 for sensing the level of the oil in the surge tank 151. Refer to FIGURES 3 and 10. The contacts 156 and 157 are vertically spaced from each other so that the upper contact 156 determines the upper limit of the oil level in the container 21 and surge tank 151 and the lower contacts 157 determines or sets the lower level of the oil in the container and tank. The level of the container and surge tank will vary depending upon the distance between the contacts 156 and 157. If a very small variation in level is desired, the contacts are placed close together to reduce the variation of the oil level.

The level control 154 contains a contact, now shown, which closes an electrical circuit across source 107 (see FIGURE 10). Closure of the switch in the level control 154 energizes the winding 158 of solenoid 159. Solenoid 159 controls the hydraulic valve 161 to open and close the valve. Valve 161 controls the amount of new liquid which is permitted to flow into the surge tank 151 through line 153. If, for example, the liquid level in the surge tank 151 falls below the contact 157, a signal is generated which closes a switch in the level control 154. The solenoid 159 is energized by the source 107 which opens the valve 161. Liquid flows from the container 152 into the surge tank 151 until the liquid level in the surge tank touches the upper contact 156. When upper contact 156 senses the oil, the control 154 opens the line across the source 107 to de-energize the solenoid 159 and return it to the closed position. Thus the valve 161 is closed and the flow of oil into the surge tank 151 is terminated. Additional new oil is not introduced into the surge tank 151 until contact 157 again senses the oil level of the surge tank. Since the volume of oil contained in the system is relatively small as compared with the amount of product cooked in the continuous fryer over a given period of time, the introduction of new oil into the surge tank 151 occurs on a nearly constant basis. The fried food product such as a cereal, removes the oil at a constant and rapid rate. This removal of the oil at a rapid rate results in a flow of new oil into the surge tank 151 and into the system on a relatively constant basis.

In order to maintain the oil in the system in good condition with a low free fatty acid concentration, a high replacement rate is desirable. Replacing the entire volume of the oil in the system at least once in about every three to four hours is the least frequent replacement rate which will maintain the oil in an overall high quality condition. Consequently, the rate of rotation of the Ferris wheel 28 and the quantity of material placed in the buckets 46 by the meter 111 is adjusted so that the product removes the entire volume of the oil in the system in about three to four hours. If the product absorbs or carries away a very small amount of oil, the volume of the oil in the system must be reduced in order to attain this optimum removal rate. The volume in the system may be reduced by simply reducing the size of the components in the system.

On the other hand, if the product removes a high volume of oil, the problem is somewhat less to maintain an exchange of the oil at least on a three hour basis. The product which removes a higher percentage of the oil may actually remove a volume which will result in a need to replace the oil more frequently than on a three hour basis. This does not require an adjustment of the components or volume of the system since a more frequent replacement of the volume of oil in the system has been found to maintain the oil in good condition with a very low free fatty acid concentration. Theoretically, the most desirable replacement rate of the oil is instantaneous. Thus new oil would be present in the system at all times. As a practical matter however, it is not possible or desirable to use fresh oil at all times. Consequently, as noted, it has been found that if the oil is replaced on a volumetric basis at least every three hours, the free fatty acid concentration which is being used as the basis for measuring the quality of the oil, will remain at a constant level which is very acceptable for deep fat frying a food product such as cereal.

Refer next to FIGURE 11 of the drawings where there is shown a graph where the percent of free fatty acid in the cooking oil is plotted against the number of hours of operation of the particular machines involved. Curves 171 and 172 are compiled from data taken in connection with the operation of a batch fryer which is a commercially available unit commonly used in the deep fat frying industry. Curves 173 and 174 are curves constructed from data taken during the operation of the continuous deep fat fryer which is the subject matter of this application. In each instance the temperature of the frying oil which is in the frying container was maintained at 395° F. The oil used to compile the data was new coconut oil which had a FFA concentration of about .02%. Often, however, new oil will have a free fatty acid concentration of from about .01% to .04%.

The percentage of free fatty acid concentration in the oil was selected as a measure of the quality of the frying oil. Free fatty acid is commonly used in the deep frying industry which includes cereal production and potato chip production, to indicate the quality of the oil after it has been used in a deep fat frying operation. Free fatty acid content, as the term is used herein, is determined by titration of a sample dissolved in a 95% ethanol solution with a 0.1 sodium hydroxide to a phenolphthalein end point.

Curve 71 is a test of the quality of the frying oil in the batch fryer as measured by the percent of free fatty acids present in the oil, over a period of 25 hours operation. The oil was maintained at 395° F. for the entire period but no product was fried. It should be noted that the percentage of free fatty acid increased rather sharply throughout the 25 hours of operation. Next the batch fryer was recharged with fresh oil and a cereal product was fried in the oil in the usual manner of operation of the batch fryer. Tests were made of the percent free fatty acids present in the oil over a period of 25 hours of operation. The results of this data is illustrated by the curve 172 in FIGURE 11. Here again the concentration of the free fatty acids in the frying oil is noted to rise very sharply and continue to rise at varying rates over the entire 25 hours of operation. The batch fryer is of the type in which oil is replaced on a periodic but not a continuous basis when oil is needed. It is noted that the concentration of the free fatty acid rapidly exceeds the commonly used discard specification of 0.5% free fatty acids. When no product is being cooked, the .5% value is exceeded after approximately four hours of operation. This same discard specification of .5% is exceeded in about 8 hours when product is actually cooked in the fryer. After exceeding the .5% value, the concentration of free fatty acids continued to increase rapidly beyond acceptable limits.

Next the continuous deep fat fryer according to this invention was charged with fresh coconut oil and the oil was heated to a temperature of 395° F. The circulatory system was started and the heater was connected to automatically maintain a temperature of 395° F. No product was fried when this data was gathered. Periodic tests of the concentration of free fatty acids in the oil were taken and curve 173 is the result of the gathered data. It is noted that the curve 173 is nearly a flat curve. Even at the end of 25 hours of operation at the noted temperature, the free fatty acid concentration in the oil was well below the .5% free fatty acid which is commonly regarded as the discard point for the oil. Next the continuous deep fat fryer was charged with a fresh batch of coconut oil and a cereal product like that used in the batch fryer was fried in the fryer continuously for 25 hours. It is noted when the product is being cooked in the fryer, that the free fatty acid concentration rises to about the .07% free fatty acid level and does not increase beyond that point for the entire 25 hour period of cooking. This FFA level may be somewhat nearer .1% if the new oil contains a higher FFA concentration. This virtually flat curve 174 indicates that the concentration of the free fatty acid in the oil remains constant for an extended period of time, well below the accepted discard specification of .5% free fatty acid concentration in a frying oil. The test data for curve 174 was gathered while the oil in the continuous fryer was being replaced on a volumetric basis about once every three hours. As previously indicated a more rapid volumetric replacement rate of the frying oil in the continuous deep fat fryer will result in at least as satisfactory results as that indicated by the curve 174.

This constant concentration of free fatty acid which is established in the oil after about 6 hours of cooking, permits deep fat frying of various food products with a high degree of quality control of the product. The concentrations of free fatty acid which are believed to affect the flavor of the product are precisely none when fried in the continuous deep fat fryer. Consequently, a precise and uniform flavor can be established in a food product because of the small variation of the free fatty acid concentration over an extended period of time.

Any number of food products may be cooked in the continuous deep fat fryer. In the above data, the product which was used was a cereal product composed primarily of corn flour with a small amount of oat flour. Other cereals such as wheat, rice and combinations of the various cereals may be formed into a dough type product and may be cooked in the deep fat fryer. It should be noted however, that whole grain cereals may be fried in the deep fat fryer with a proper adjustment of the temperature and other adjustable factors. It is also to be noted that the above list of cereal products is not to be deemed as limiting on the types of products which may be utilized in the continuous fryer nor are the products to be deemed as limiting or the process of cooking a food product as is set forth hereinafter.

It is to be understood that the above described continuous deep fat fryer may be used on a number of food products. A specific example, however, of the continuous deep fat frying of a cereal product involves the following:

|  | Percent |
| --- | --- |
| Corn flour | 75.3 |
| Oat flour | 10 |
| Sugar | 6.3 |
| Salt | 3.1 |
| Starch | 5.3 |

The above mixture of cereal products is then formed in a dough and pellatized before it is placed in the meter 111. The temperature of the oil in the fryer is adjusted so that the oil in the container 21 is from about 330° F. to about 420° F. The rotation of the Ferris wheel 28 is adjusted so that the time that the product is submerged in the oil of the container 21 varies from about 5 to about 50 seconds depending upon the particular taste characteristics which are desired for the final product, the nature of the product itself, and the precise temperatures which is chosen as the operating temperature.

Refer now to FIGURE 12 of the drawings which shows a flow diagram of a process utilized in connection with the above described continuous fryer to cook, the cereal product. The product is fed into the meter 111 of the apparatus. The meter 111 then dumps the predetermined amount of product into a bucket 46 which is being rotated by the Ferris wheel 28 at a predetermined rate. This processing step is represented by box 181 of the drawings. Next the cereal product is carried by the buckets 46 into the oil in the container 21. Here the product is cooked in the hot frying oil for a predetermined time as determined by the rate of rotation of the Ferris wheel 28. The product may or may not be submerged in the oil of the container 21. However, complete submersion of the product is preferable since it prevents the product from floating to the surface of the oil where uneven and uncontrolled rates of cooking may take place in the product. If the product is not completely submerged in the oil, the product may remain partially uncooked and result in a finished product which is not uniform in quality. The lid of the bucket 46 insures that the product may be completely submerged in a preferred method of cooking the product. This submersion of the product in the cooking oil is represented by box 182 which illustrates an alternate method of treating the product. In other words the feeding of the product into the oil may not involve the step of completely submerging the product. However, a preferred method does include complete submersion of the product.

Prior to and during the frying of the product in the oil, the oil circulating system which includes the pump is actuated to circulate the oil through the tank 21, the filter, the heater, and the various conduits of the system. The circulating oil contacts and uniformly fires the product. As noted previously, this circulation insures a high quality of the heating oil by reducing the breakdown of oil as a result of high heating temperatures in the filament of the heater. It also aids removal, on a rather frequent basis, of products which may be discharged into the oil from the buckets 46. These products also as noted have a tendency to clog the system and interfere with free circulation as well as reduce the overall quality of the oil by the suspension of a number of overcooked particles in the oil. As noted in connection with box 183 of the flow diagram, the circulated oil is heated to a frying temperature depending upon the product and other factors as noted herein.

Simultaneously with the feeding of the product, submersion of a product in the frying oil and circulation of the oil; fresh oil is continuously introduced into the deep fat fryer in order to replace the oil removed by the cooked product and also to aid maintenance of the overall high quality of the oil circulated in the system. As noted with box 184 of the flow diagram, the oil is replenished simultaneously with the circulating, heating, submerging, and feeding of the product. The replenishment of the oil is accomplished in the continuous fryer by a level control which was described in connection with the surge tank. The level control regulates a valve interconnecting a source of new oil and the surge tank. The valve is opened or closed in accordance with the level of the oil in the container 21. Ideally this replenishment of the oil should take place on a nearly constant basis. Constant replacement of the oil help maintain a constant low concentration of free fatty acid in the oil used to fry the product. Replacement of oil on a batch basis tends to result in a build-up of the free fatty acids and consequently results in a non-uniform concentration of the free fatty acid over an extended period of cooking.

After the cereal product has been submerged in the cooking oil for a predetermined time such as from about 5 to about 50 seconds depending upon the product and other factors, the product is then discharged from the frying container 21. The fried product carries a great deal of the cooking oil from the container 21 as previously noted. This fried product is then discharged for packaging or for subsequent treatment if additional qualities need be introduced into the product. The above process may be carried out under somewhat different conditions by utilizing for instance a cereal product composed primarily of corn. The corn or the corn product may be fed in a pellet form into the circulating oil where it is fried at a temperature of from about 380° F. to about 405° F. With these temperatures, a frying time of about 6 to 12 seconds produces a uniform, palatable product of high quality. Any of the oils or frying materials normally used in a deep fat fryer may be used in this continuous process for frying the product; safflower oil, corn oil and coconut oil have been found to work quite well.

In a preferred embodiment, the above listed product is submerged in oil such as safflower oil which has been heated to a temperature of about 395° F. With these conditions it has been found that a frying time of about 8 seconds produces a high quality product. The product is uniformly cooked and is crisp and flavorful. Again note that the product could be simply fed into the heated oil, however, complete submersion of the product in the oil is again preferred in order to maintain a high uniformity of cooking of the product. This product tends to float on the surface of the cooking oil and submersion of the product during the cooking time of 8 seconds results in a higher overall quality of the cooked product.

It should be noted that the above process can be carried out by simply replacing the cooking oil each time a batch of the product is cooked. In so doing the free fatty acid concentration of the oil which influences the flavor of the finished product could be maintained at a very low level very near the value of .03% or less of free fatty acid which is characteristic of new oil. However, the process may also be carried out in the above described apparatus wherein the free fatty acid concentration of the oil is maintained at the very low and constant level of about .07% free fatty acid (see curve 174 of FIGURE 11). Use of the above described apparatus permits continuous cooking of a vast quantity of the product and results in a high quality product. The temperatures needed for the frying operation can be maintained for extended periods of time to insure that no undercooked or overcooked product results.

It is to be understood that the above described arrangements of apparatus and arrangements of process steps are simply illustrative of the application of the principles of the invention. Numerous other arrangements may be readily devised by those skilled in the art which will embody the principles of the invention and fall within the spirit and scope thereof.

The embodiments of the invention in which an exclusive property or privilege is claimed are defined as follows:

1. A deep fat fryer apparatus for cooking food products in a cooking oil which comprises a container for hot cooking oil; buckets for carrying the products to be cooked; means for moving the buckets relative to said container through an operational cycle of constant duration wherein said buckets are successively charged with products, submerged in the cooking oil, and purged of the products; means for purging said bucket of said products; means for charging said buckets with the products; a power operated timing device interconnecting said means for charging, said means for purging, and said means for moving to effectuate the operational cycle and to drive said means for moving; a heater remotely located with respect to said container for heating said oil; and a circulatory system for continuously circulating the heated oil between said heater and said container.

2. An apparatus in accordance with claim 1 which further includes a surge tank in said circulatory system, a source of oil for replenishing the oil in said system, a solenoid operated valve interconnecting said source and said surge tank, and means responsive to the oil level in said surge tank for actuating said valve to direct cold oil from said source to said surge tank.

3. An apparatus in accordance with claim 2 which further includes a flow meter in said circulatory system for sensing the rate of oil flow in said system and a valve means responsive to said flow meter for regulating the rate of flow of oil in said system.

References Cited by the Examiner

UNITED STATES PATENTS

| | | | |
|---|---|---|---|
| 1,630,676 | 5/1927 | Smith | 99—404 |
| 1,961,532 | 6/1934 | Synder | 99—354 |
| 1,993,609 | 3/1935 | Kennedy | 99—404 X |
| 2,106,156 | 1/1938 | Munro. | |
| 2,112,309 | 3/1938 | Santillan | 99—400 X |
| 2,253,567 | 8/1941 | Kochenour et al. | 99—404 |
| 2,616,359 | 11/1952 | Pierson | 99—404 |
| 2,807,203 | 9/1957 | Buechele et al. | 99—404 |
| 2,997,190 | 8/1961 | Reed | 214—59 X |
| 3,022,722 | 2/1962 | Arvan | 99—404 |
| 3,036,513 | 5/1962 | Reeves | 99—404 |

WALTER A. SCHEEL, *Primary Examiner.*

BILLY J. WILHITE, *Examiner.*